United States Patent
Kumagai et al.

(10) Patent No.: US 6,736,008 B2
(45) Date of Patent: May 18, 2004

(54) INERTIA FORCE SENSOR

(75) Inventors: Munehito Kumagai, Tokyo (JP); Yukihisa Yoshida, Tokyo (JP); Kazuhiko Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/300,751

(22) Filed: Nov. 21, 2002

(65) Prior Publication Data

US 2003/0217597 A1 Nov. 27, 2003

(30) Foreign Application Priority Data

May 24, 2002 (JP) ......................... 2002-150915

(51) Int. Cl.[7] .............. G01P 3/44; G01P 9/04
(52) U.S. Cl. .............. 73/504.14; 73/504.02; 73/504.12
(58) Field of Search ............ 73/504.14, 504.04, 73/514.16, 514.29, 574.01, 514.32, 504.15, 504.02, 514.38, 862.382

(56) References Cited

U.S. PATENT DOCUMENTS 5,501,893 A    3/1996   Laermer et al.
6,487,908 B2 * 12/2002   Geen et al. .............. 73/504.12

FOREIGN PATENT DOCUMENTS

EP    1 203 748 A1    5/2002

OTHER PUBLICATIONS

Kobayashi, Shinji et al., "Double–Frame Silicon Gyroscope Packaged Under Low Pressure by Wafer Bonding", Transducers 1999, pp. 910–913.

* cited by examiner

Primary Examiner—Helen C. Kwok
(74) Attorney, Agent, or Firm—Leydig, Voit & Mayer, Ltd.

(57) ABSTRACT

An inertia force sensor with a damper. The damper includes a cantilever for a movable part disposed in a movable electrode protruding therefrom, and a cantilever for a fixed part disposed in a support portion for the movable part or a support portion for the fixed part and protruding therefrom. The damper allows the cantilever for the movable part and the cantilever for the fixed part to contact each other before the movable electrode contacts the support portion for the movable part and the support portion for the fixed part. As a result, it is possible to prevent a stopper from being damaged and to improve the reliability of the sensor.

5 Claims, 14 Drawing Sheets

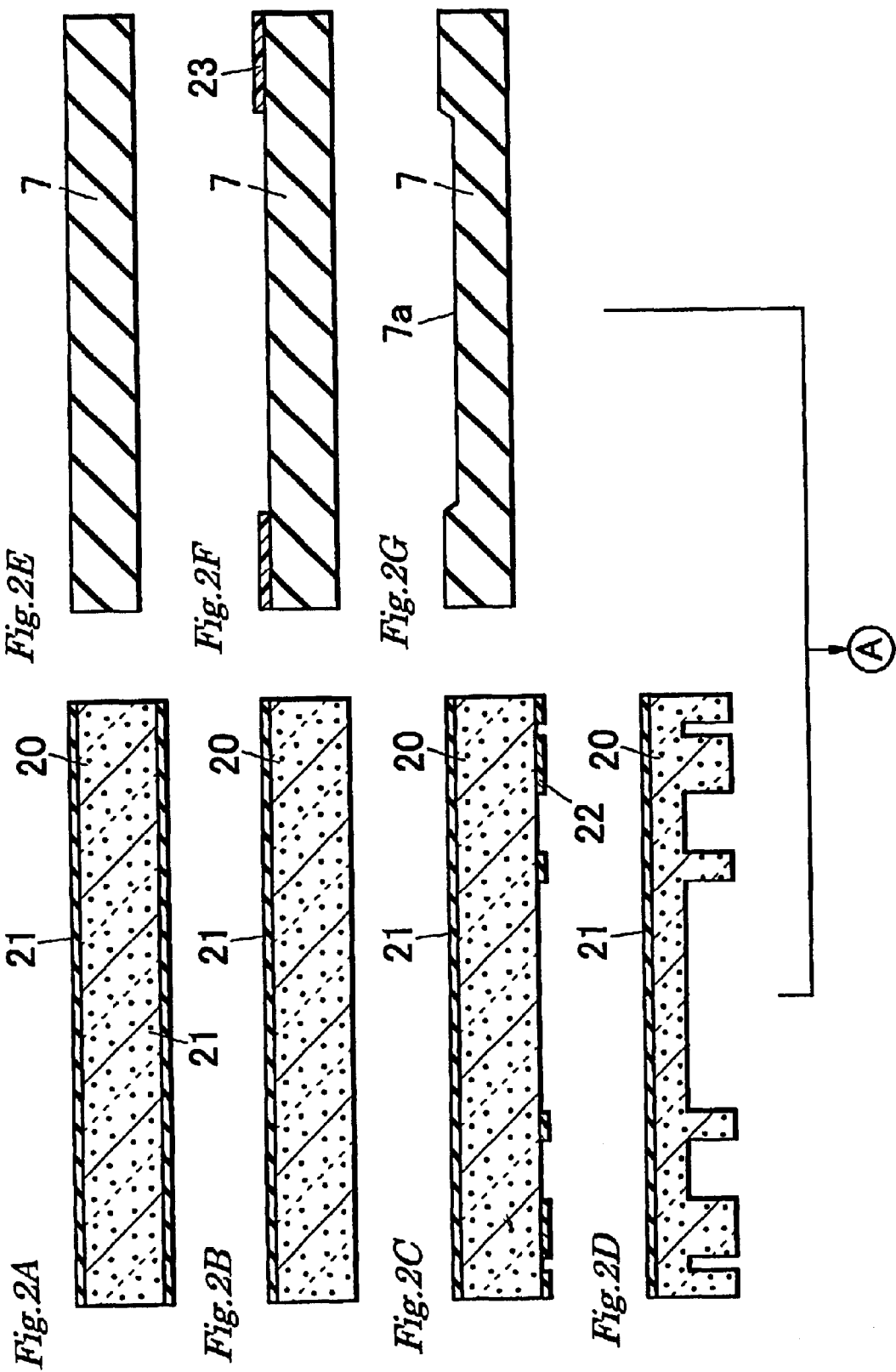

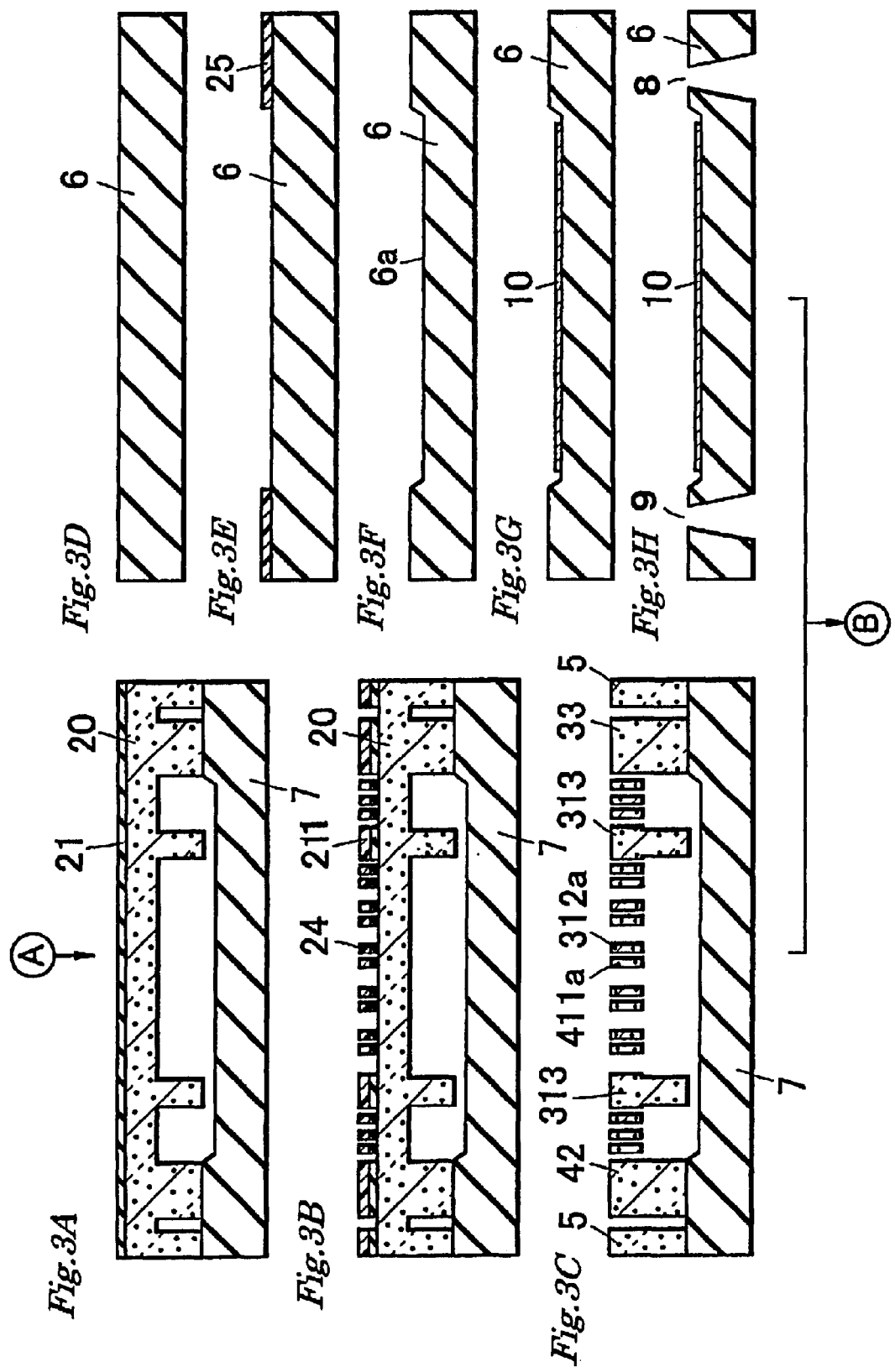

*PRIOR ART*

INERTIA FORCE SENSOR

BACKGROUND OF THE INVENTION

1. Field of the Invention

The invention relates to an inertia force sensor including a silicon structure formed on an insulating substrate and, more particularly, to an accelerometer or an angular velocity sensor used for vehicle posture control of automobile or collision detection in an air bag system.

2. Description of the Related Art

FIG. 10 is an exploded perspective view showing an example of the structure of an inertia force sensor I of the prior art.

The inertia force sensor I includes a silicon structure 2, a lower glass substrate 7 that has a recess 7a that forms a clearance space on the surface thereof and an upper glass substrate 6 that has a recess 6a on the surface thereof. The inertia force sensor has such a constitution as the silicon structure 2 is sandwiched by the lower glass substrate 7 and the upper glass substrate 6 that are bonded with the silicon structure, so that the recess 6a and the recess 7a face inward. The inertia force sensor is hermetically sealed. The upper glass substrate 6 has electrode lead-out portions 8, 9 that penetrate the substrate and are used for connection with an external circuit. The electrode lead-out portions 8, 9 make contact with metallic electrodes 331, 421 of the silicon structure 2, respectively, thereby establishing electrical continuity. Surface of the recess 6a of the upper glass substrate 6 is covered with a metal film 10 that prevents movable electrode portions to be described later from sticking onto the upper glass substrate when applying anodic bonding of the silicon structure 2 and the upper glass substrate 6.

The silicon structure 2 includes a movable portion 3 and a fixed portion 4, that are functional sections, and a frame portion 5 that surrounds and protects the two functional sections, as shown FIG. 11. The movable portion 3 includes a movable electrode portion 31, a pair of beam portions 32 that support the movable electrode portion 31 in the air, and a pair of support portions 33, 33 that support the beam portion 32 and are bonded to the lower glass substrate 7. The movable electrode portion 31 includes a base portion 311, a comb-shaped electrode portion for the movable part 312 that consists of a plurality of cantilever electrodes 312a disposed at equal intervals on both sides of the base portion 311 in the longitudinal direction and extending over the recess 7a from the base portion 311, and a pair of weights 313, 313 that are connected to both ends of the base portion 311 and increase the displacement of the movable portion 3 due to inertia force, with these components being formed in a single piece.

Each of the pair of fixed portions 4, 4 includes a fixed electrode portion 41 and a support portion 42 that supports the fixed electrode portion 41 and is bonded onto the lower glass substrate 7. The fixed electrode portion 41 has a comb-shaped electrode portion for the fixed part 411 including a plurality of cantilever electrodes 411a that extend over the recess 7a and are disposed to oppose, with a very small distance, the plurality of cantilever electrodes 312a of the movable electrode section 31. Each pair of the cantilever electrode 312a and the cantilever electrode 411a forms a capacitive electrode.

Reference numeral 11 denotes a first stopper portion that restricts the movable portion 3 from making an excessive displacement in the direction of the inertia force, and includes a movable protruding portion 313a consisting of corners of the weight portion 313 and a fixed protruding portion 42a disposed on the support portion 42. When the movable portion 3 is displaced, the movable protruding portion 313a and the fixed protruding portion 42a of the support portion 42 are brought into contact with each other, thereby restricting an excessive displacement. Reference numeral 12 denotes a second stopper portion that functions similarly to 11, and includes the movable protruding portion 313a consisting of corners of the weight portion 313 and a fixed protruding portion 33a consisting of the protruding portion disposed in the support portion 33. An example of a cantilever type accelerometer provided with a stopper portion is disclosed in Japanese Laid-open Patent Publication No. 6-308151, Japanese Laid-open Patent Publication No. 8-43436 and Japanese Laid-open Patent Publication No. 11-94872.

FIG. 12 is a longitudinal sectional view taken along lines XII-XII' in FIG. 11, showing the silicon structure 2 bonded with the upper glass substrate 6 and the lower glass substrate 7.

Silicon is machined to form the silicon structure by reactive ion etching (hereinafter referred to as ICP-RIE) that uses inductively coupled plasma (ICP) as an activation energy source. Since the ICP-RIE process is free from anisotropy of etching due to the crystal orientation of silicon, degree of freedom in the design of the silicon structure configuration can be made much higher than in the case of conventional alkaline wet process, thereby allowing etching operation with high accuracy. An example of angular velocity sensor fabricated by employing the ICP-RIE process is described by S. Kobayashi et al., "Double-frame Silicon Gyroscope Packaged Under Low Pressure By Wafer Bonding", Proc. of Transducers, '99, pp. 910–913.

SUMMARY OF THE INVENTION

The present inventors have found out the problems described below in the inertia force sensor of the prior art. FIG. 13 is a schematic plan view showing an example of the state of the inertia force sensor I under an excessive inertia force F. While the movable protruding portion 313a and the fixed protruding portion 42a that constitute the first stopper portion 11 shown at the left-hand side of drawing make contact with each other, the movable protruding portion 313a and the fixed protruding portion 33a that constitute the second stopper portion 12 shown at the left-hand side of drawing make contact with each other, thereby restricting the movable portion 3 from making an excessive displacement under the inertia force F. FIG. 14 and FIG. 15 are schematic plan views showing the first stopper portion 11 and the second stopper portion 12 in FIG. 13, respectively, in enlarged view. As shown in FIG. 14, there have been such cases as the movable protruding portion 313a and the fixed protruding portion 42a make violent contact and break in the first stopper portion 11. This leads to such problems as the movable portion 3 being cracked or chips of broken silicon entering minute gaps of the silicon structure, thus resulting in lower reliability of the sensor due to malfunction or failure of the sensor. Also as shown in FIG. 15, the same problem as in the first stopper portion 11 can occur in the second stopper portion 12. Also the corner of the weight portion 313 of the movable electrode portion 31 may hit the cantilever electrode 411a disposed at the distal end of the fixed electrode portion 41 thereby cutting off the cantilever electrode 411a, resulting in lower reliability of the sensor due to malfunction or failure of the sensor.

An object of the present invention is to solve the problems described above and to provide an inertia force sensor that has higher reliability by preventing the sensor from being damaged by excessive displacements due to inertia force.

The inertia force sensor of the invention, in order to achieve the object described above, includes insulating substrates and a silicon structure that is bonded between the insulating substrates with clearance space secured therebetween, wherein the silicon structure has a movable portion and a fixed portion, with the movable portion having a movable electrode portion that is capable of making displacement in the direction of inertia force, a pair of beam structures for the movable portion that are connected to both ends of the movable electrode portion and support the movable electrode portion in the air over the clearance space and a pair of support portions for the movable portion that support the beam portion for the movable portion and are bonded to the insulating substrate, and the fixed portion has a fixed electrode portion disposed to oppose the movable electrode portion and a support portion for the fixed part that supports the fixed electrode portion and is bonded to the insulating substrate. Stopper portions that restrict the displacement of the movable electrode portion are provided on the outer four corners of the pair of the beam structures for the movable portion such that the movable electrode portion is brought into contact with the support portion for the movable part and the support portion for the fixed part. A damper portion, that consists of a cantilever for the movable part that is provided on the movable electrode portion so as to protrude therefrom and extend over the clearance space and a cantilever for the fixed part that is provided on the support portion for the movable part or the support portion for the fixed part so as to protrude therefrom and extend over the clearance space, is disposed near each of the stopper portions so that the cantilever for the movable part and the cantilever for the fixed part make contact with each other, before the movable electrode portion contacts the support portion for the movable part and the support portion for the fixed part.

According to the invention, since the cantilever for the movable part and the cantilever for the fixed part that constitute the damper portion are brought into contact with each other prior to the stopper portion, impact on the stopper portion can be mitigated by elastic deformation of the cantilever that absorbs excessive inertia force due to impact. This makes it possible to prevent damage from being caused on the stopper portion, thereby improving the reliability of the inertia force sensor.

The inertia force sensor of the invention can employ the cantilever for the movable part and the cantilever for the fixed part disposed substantially at right angles to the direction of movable electrode displacement.

The inertia force sensor of the invention may also have such a constitution as distance between the cantilever for the movable part and the cantilever for the fixed part is made smaller than a distance between the movable electrode portion and the support portion of the movable portion, and also than a distance between the movable electrode portion and the support portion of the fixed portion in the stopper portion.

The inertia force sensor of the invention may also have such a constitution as the movable electrode portion has a comb-shaped electrode portion for the movable part that consists of a plurality of cantilever electrodes disposed on both sides of the longitudinal direction and extending over the clearance space, and the fixed electrode portion has a comb-shaped electrode portion for the fixed part that consists of a plurality of cantilever electrodes that extend over the clearance space, while the plurality of cantilever electrodes of the comb-shaped electrode portion for the movable part and the comb-shaped electrode portion for the fixed part are disposed to oppose each other via a very small gap, and at least a pair of opposing cantilever electrodes of the comb-shaped electrode portion for the movable part and the comb-shaped electrode portion for the fixed part are made to have higher rigidity than the rest of the cantilever electrodes, thereby forming a damper portion.

BRIEF DESCRIPTION OF THE DRAWINGS

The above and other objects and features of the present invention will become more apparent from the following description of the preferred embodiments thereof made with reference to the accompanying drawings, throughout which like parts are designated by like reference numerals.

FIGS. 2A to 2G are schematic sectional views showing part of a manufacturing process for the inertia force sensor according to the first embodiment of the invention.

FIGS. 3A to 3H are schematic sectional views showing part of a manufacturing process for the inertia force sensor according to the first embodiment of the invention.

DESCRIPTION OF THE PREFERRED EMBODIMENTS

The present disclosure relates to subject matter contained in application No.2002-150915 filed May 24, 2002 in Japan, the content of which is incorporated hereinto by reference.

Embodiment 1

Figure 1:
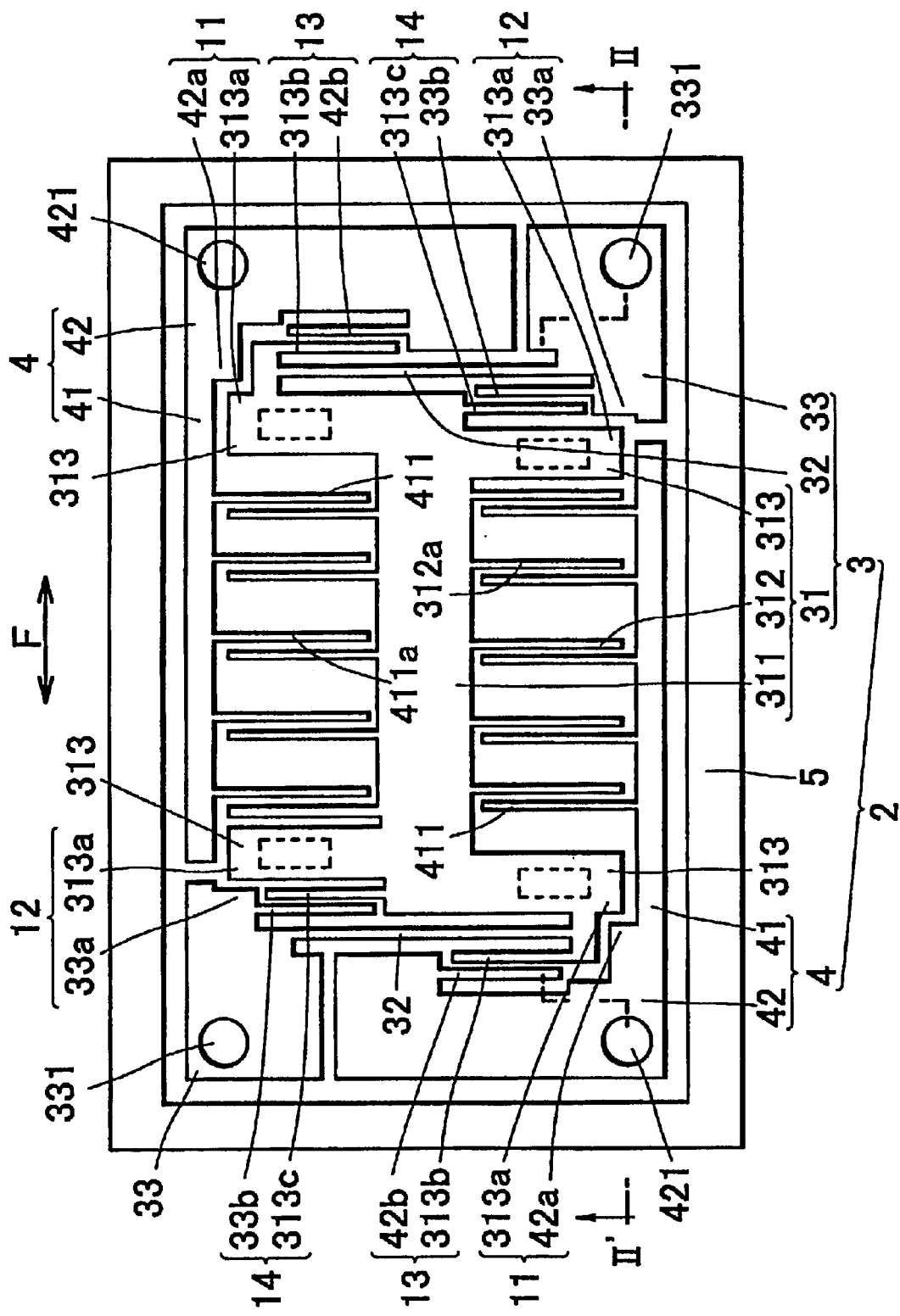
FIG. 1 is a schematic plan view showing the construction of the silicon structure that constitutes the inertia force sensor according to the first embodiment of the invention.

FIG. 1 is a schematic plan view showing an example of the construction of the silicon structure that constitutes the inertia force sensor of this embodiment. The silicon structure 2 includes the movable portion 3 and the fixed portion 4, that are functional sections, and a frame portion 5 that surrounds and protects the functional sections. The movable portion 3 includes a movable electrode portion 31, a pair of beam structures 32 that support the movable electrode portion 31 in the air, and a pair of support portions 33, 33 that support the beam structures 32 and are bonded to a lower glass substrate 7. The movable electrode portion 31 includes a base portion 311, a comb-shaped electrode portion 312 that consists of a plurality of cantilever electrodes 312a disposed at equal intervals on both sides of the base portion 311 in the longitudinal direction and extending from the base portion 311 over the recess 7a, and a pair of weights 313, 313 that are connected to both ends of the base portion 311 and increase the displacement of the movable portion 3 due to inertia force, with these components being formed in a single piece.

Each of the pair of fixed portions 4, 4 includes a fixed electrode portion 41 and a support portion 42 that supports the fixed electrode portion 41 and are bonded onto the lower glass substrate 7. The fixed electrode portion 41 has a plurality of cantilever electrodes 411a that extend over the recess 7a and are disposed so as to oppose the plurality of cantilever electrodes 312a of the movable electrode portion 31 via a very small gap.

Reference numeral 11 denotes a first stopper portion that restricts the movable portion 3 from making an excessive displacement in the direction of the inertia force, and includes a movable protruding portion 313a of the weight portion 313 and a fixed protruding portion 42a disposed on the support portion 42. Reference numeral 12 denotes a second stopper portion that functions similarly to 11, and includes the movable protruding portion 313a of the weight portion 313 and a fixed protruding portion 33a disposed on the support portion 33. When the movable portion 3 is displaced, in the first and second stopper portions, the movable protruding portion 313a and the fixed protruding portion 42a or the fixed protruding portion 33a are brought into contact with each other, thereby restricting an excessive displacement. As described above, the first stopper portions 11, 11 and the second stopper portions 12, 12 are disposed on four corners of the movable electrode portion 31 outside the beam portion of the movable portion 32, so as to be capable of restricting the displacement of the movable electrode portion 31 either in leftward or rightward direction under an excessive inertia force.

Reference numeral 13 denotes a first damper portion that reduces the impact of the first stopper portion 11, and includes a cantilever for the movable part 313b disposed to protrude in parallel to the beam structure of the movable portion 32 outside the beam structure of the movable portion 32, and a cantilever for the fixed part 42b disposed on the support portion for the fixed part 42 so as to protrude in parallel to the cantilever for the movable part 313b. Reference numeral 14 denotes a second damper portion that reduces the impact of the second stopper portion 12, and includes a cantilever for the movable part 313c disposed to protrude in parallel to the beam structure of the movable portion 32 inside the beam structure of the movable portion 32, and a cantilever for the fixed part 33b disposed on the support portion for the movable part 33 so as to protrude in parallel to the cantilever for the movable part 313c.

The sensor detects acceleration in the direction of arrow F in FIG. 1. The comb-shaped electrode portion for the movable part 312 and the comb-shaped electrode portion for the fixed part 411 that are constituted from the plurality of cantilevers help maximize the area of the mating electrodes that is proportional to the change in electrostatic capacity in the limited sensor area. When an acceleration is applied, the base portion 311 of the movable electrode portion 31 makes a displacement in the direction of arrow F (direction of main axis), so that the distance between the cantilever electrodes 312a of the comb-shaped electrode portion 312 and the cantilever electrodes 411a of the comb-shaped electrode portion 411 changes. This change in distance causes a change in the electrostatic capacity. The change in the electrostatic capacity is converted by a C-V converter provided outside the sensor into a voltage that is proportional to the acceleration and is output.

Now an example of method for manufacturing the inertia force sensor according to this embodiment will be described below with reference to FIG. 2A to FIG. 4. In a process shown in FIG. 2A to FIG. 2D, the silicon substrate is processed on the surface thereof. In a process shown in FIG. 2E to FIG. 2G, the recess is formed on the lower glass substrate. In a process shown in FIG. 3A to FIG. 3C, the silicon substrate and the lower glass substrate are bonded together, and the silicon substrate is processed so as to form the silicon structure that has the beam structure. In a process shown in FIG. 3E to FIG. 3G, the recess is formed on the upper glass substrate and a metal film is formed in the recess to prevent sticking. In a process shown in FIG. 4A and FIG. 4B, the upper glass substrate that has been processed is bonded on the silicon structure, electrode lead-out portions are formed in the upper glass substrate and then the individual sensors are separated by dicing, thereby completing the inertia force sensor. The word "surface" of the silicon substrate refers to the surface that is joined with the lower glass substrate.

Now the processes will be described in more detail below.

In the process shown in FIG. 2A, a silicon substrate 20 (400 μm thick) is prepared in the form of silicon wafer having a thermal oxidation film 21 that is 1 μm thick formed on the surface. In the process shown in FIG. 2B, the thermal oxidation film 21 is removed from on side of the silicon substrate 20 using buffered hydrofluoric acid. In the process shown in FIG. 2C, after removing the thermal oxidation film 21 from the silicon substrate 20, a first mask layer 22 is formed by photolithography from a resist suitable for the shape of the support portion. In the process shown in FIG. 2D, the silicon substrate 20 having the first mask layer 22 is etched to a depth of 250 μm by dry etching of ICP-RIE process. Then the resist that remains on the surface is removed.

In the process shown in FIG. 2E, a lower glass substrate 7 (400 μm thick) is prepared. In the process shown in FIG. 2F, a mask layer 23 is formed from resist for the formation of the recess by photolithography process on the surface of the lower glass substrate 7. In the process shown in FIG. 2G, surface of the lower glass substrate 7 is etched to a depth of 20 μm by 10% water solution of hydrofluoric acid, so as to form the recess 7a. The recess 7a constitutes the clearance space when the silicon substrate 20 and the lower glass substrate 2 are bonded together.

In the process shown in FIG. 3A, surface of the lower glass substrate 7 and surface of the silicon substrate 20 are bonded together by anodic bonding. In the process shown in FIG. 3B, a second mask layer 24 is formed from a resist by photolithography on the back surface of the silicon substrate 20. Then a thermal oxidation film 211 is formed by electron cyclotron resonance reactive ion etching process (hereinafter abbreviated as ECR-RIE process). In the process shown in FIG. 3C, back surface of the silicon substrate 20 is etched to a depth of at least 150 μm by the ICP-RIE process using the second mask layer 24 and the thermal oxidation film 211 as the mask. This results in penetration of the silicon substrate 20, with the movable portion 3, the fixed portion 4 and the frame 5 being formed. The cantilever electrodes 312a of the movable electrode portion 31 and the cantilever electrodes 411a of the fixed electrode portion 41 are disposed to oppose each other via very small gaps, with width of the gaps being changed so that wide and narrow gaps are arranged alternately. Then thermal oxidation film 21 that remains on the back surface of the silicon substrate 20 is removed by the ECR-RIE process. The depth of etching 150 μm is determined by subtracting the depth of etching 250 μm in the process of FIG. 2D from the thickness 400 μm of the silicon substrate 20.

In the process shown in FIG. 3D, an upper glass substrate 6 (400 μm thick) is prepared. In the process shown in FIG. 3E, a mask layer 25 is formed by photolithography from a resist for the formation of a recess. In the process shown in FIG. 3F, the upper glass substrate 6 is etched to a depth of 20 μm on the surface by using 10% water solution of hydrofluoric acid, so as to form the recess 6a. The recess 6a constitutes the clearance space when the silicon substrate 20 and the upper glass substrate 6 are bonded together. Then a Cr film is formed on the surface of the recess 6a by sputtering or the like, and an anti-sticking film 10 made of Cr is formed by photolithography (FIG. 3G). Then electrode lead-out portions 8, 9 constituted from through holes are formed by sand blast (FIG. 3H).

Figure 4A:
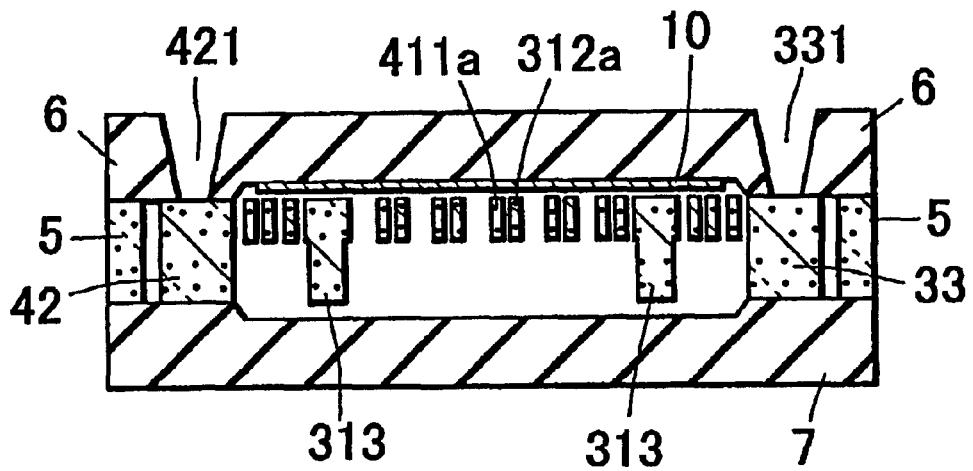
FIGS. 4A and 4B are schematic sectional views showing the manufacturing process (No.3) for the inertia force sensor according to the first embodiment of the invention.
Figure 4B:
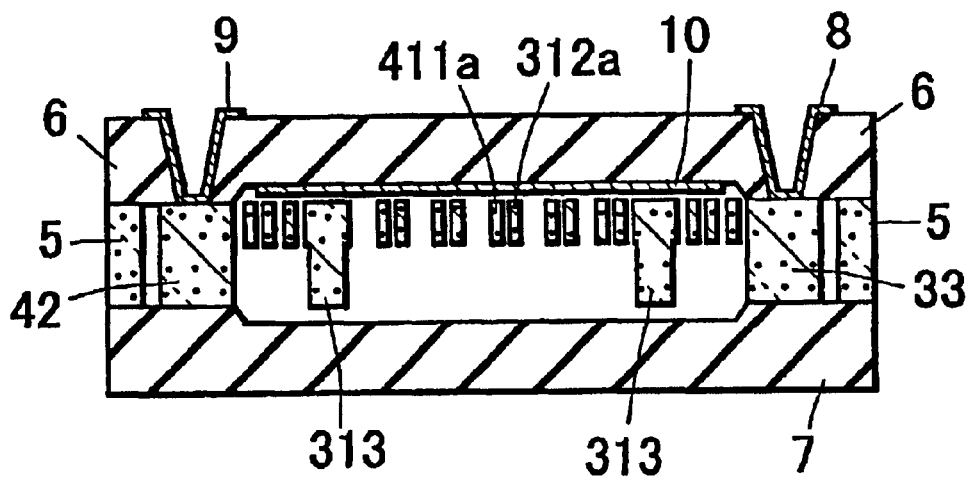

In the process shown in FIG. 4A, the back surface of the silicon substrate 20 and the surface of the upper glass substrate 6 are bonded together by anodic bonding. In the process shown in FIG. 4B, electrode films made of Pt are formed in the electrode lead-out portions 8, 9. Then the wafer is diced so as to separate into the inertia force sensors.

Figure 5:
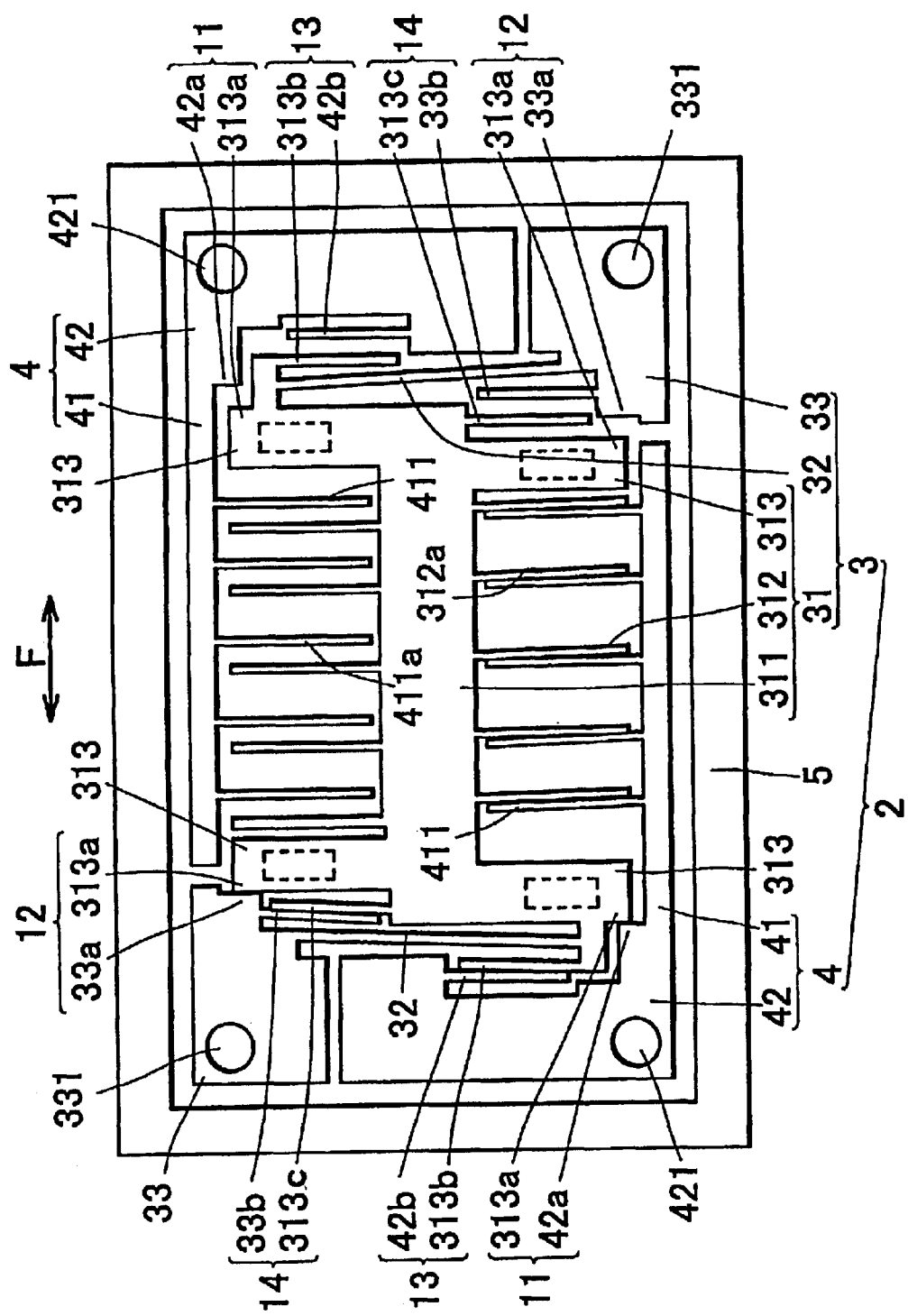
FIG. 5 is a schematic plan view showing the operating principle of the invention using the inertia force sensor according to the first embodiment of the invention.

Operation of the stopper portion and the damper portion of the inertia force sensor according to this embodiment will now be described below with reference to FIG. 5. In the inertia force sensor of this embodiment, the first damper portions 13, 13 are provided near the first stopper portions 11, 11, and the second damper portions 14, 14 are provided near the second stopper portions 12, 12, with the distance between the beam structure for the movable part and the beam structure for the fixed part in the damper portion is made smaller than the distance between the movable protruding portion and the fixed protruding portion in the stopper portion. When an excessive inertia force is generated in the direction of arrow in the drawing, first, the cantilever for the movable part and the cantilever for the fixed part of the first damper portion 13 and the second damper portion 14 contact and flex so as to absorb the impact. Then the movable protruding portion and the fixed protruding portion of the first stopper portions 11 and the second stopper portions 12 butt with each other. Thus the impact of collision of the stopper portion is reduced and the stopper portion can be prevented from being damaged. Impact on the cantilever electrode can also be reduced by making the distance between the cantilever electrode 312a and the cantilever electrode 411a larger than the distance between the cantilever for the movable part and the cantilever for the fixed part of the damper portion.

The weight portion 313 of the movable electrode portion 31 is provided for the purpose of increasing the displacement of the movable portion 3 for a given inertia force, but an effect similar to that of this embodiment can be achieved even when the weight portion 313 is omitted depending on the sensor design.

Embodiment 2

Figure 7:
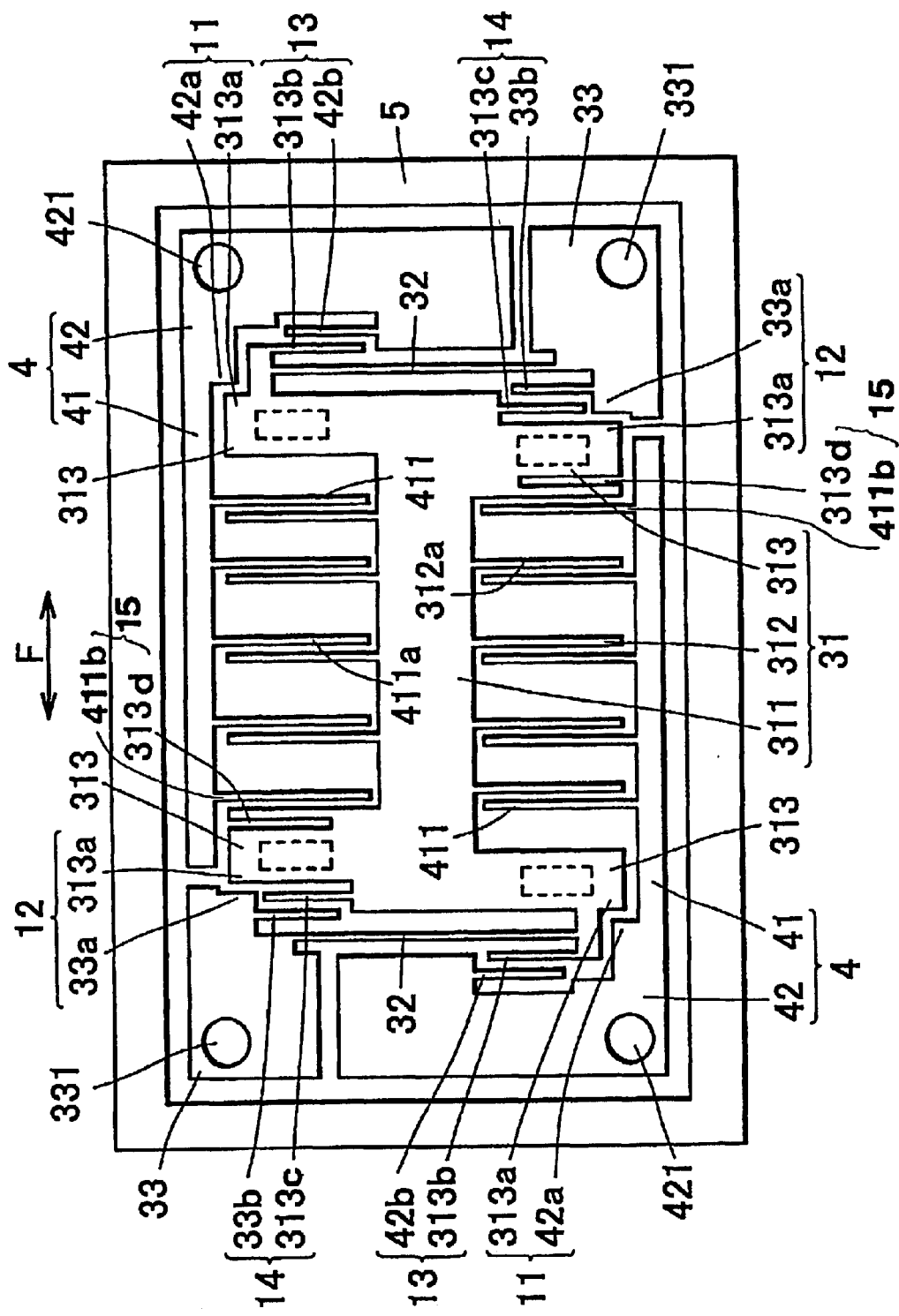
FIG. 7 is a schematic plan view showing the structure of the silicon structure that constitutes the inertia force sensor according to the second embodiment of the invention.

The inertia force sensor of this embodiment is a variation of the inertia force sensor of the first embodiment where the cantilever electrode at the distal end of the comb-shaped electrode portion for the fixed part is made as the cantilever for the fixed part and a cantilever for the movable part is provided at the end of the weight portion to form a third damper section, in addition to the first and second damper portions. As shown in FIG. 7, a cantilever for the movable part 313d is provided at the end of the weight portion 313 of the movable electrode portion 31 so as to oppose the cantilever electrode 411b located at the distal end of the comb-shaped electrode portion for the fixed part 41, thereby forming a pair of third damper portions 15, 15. When an excessive inertia force is applied, the first damper portion 13 and the second damper portion 14 contact each other prior to the first and second stopper portions 11, 12, thereby reducing the impact on the stopper portion. Moreover, the cantilever electrode 411b located at the distal end of the comb-shaped electrode portion for the fixed part 41 does not directly hit the end of the weight portion 313 but contacts the cantilever for the movable part 313d. Accordingly, since the third damper portion 15 contacts the first and second damper portions 13, 14 substantially at the same time, the cantilever electrode 411b located at the distal end of the comb-shaped electrode portion for the fixed part 41 can be prevented from directly hitting the end of the weight portion 313 and causing damage.

Embodiment 3

Figure 8:
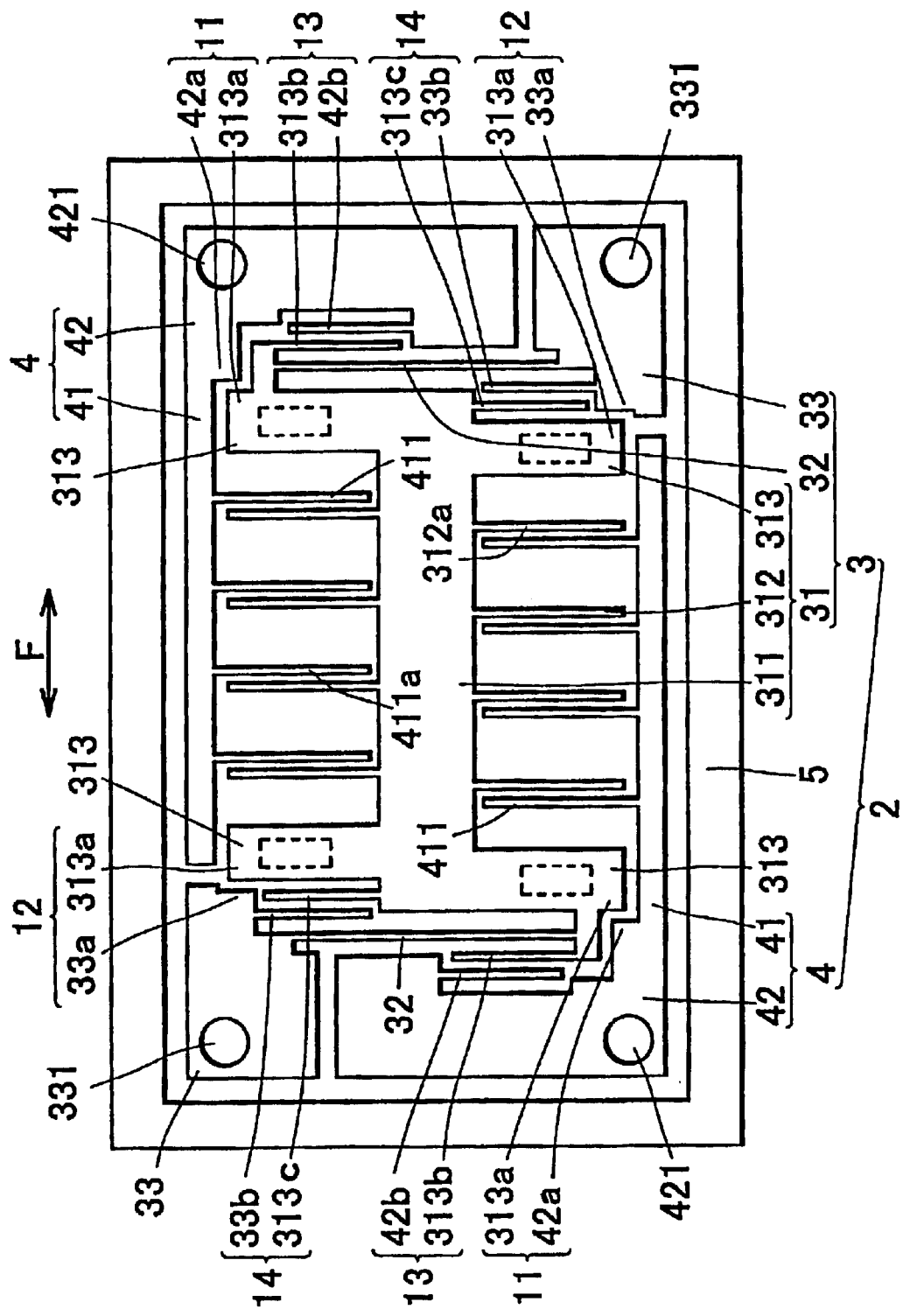
FIG. 8 is a schematic plan view showing a variation of the structure of the silicon structure that constitutes the inertia force sensor according to the third embodiment of the invention.

The inertia force sensor of this embodiment is a variation of the inertia force sensor of the first embodiment where the distance between the cantilever electrodes on both ends of the base portion of the movable electrode portion and on both ends of the comb-shaped electrode portion is made larger than the distance between the cantilever electrodes. As shown in FIG. 8, the number of the cantilever electrodes 312a and 411a of the movable electrode portion and the fixed electrode portion that constitute the capacitive electrode is made smaller than that of the first embodiment, and the distance between both ends of the base portion 311 of the movable electrode portion 31 and the cantilever electrodes 312a is made larger than the distance between the cantilever electrodes 312a. Thus the cantilever electrode 411b located at the distal end of the comb-shaped electrode portion for the fixed part 41 can be prevented from directly hitting the end of the weight portion 313 and causing damage.

Embodiment 4

Figure 6:
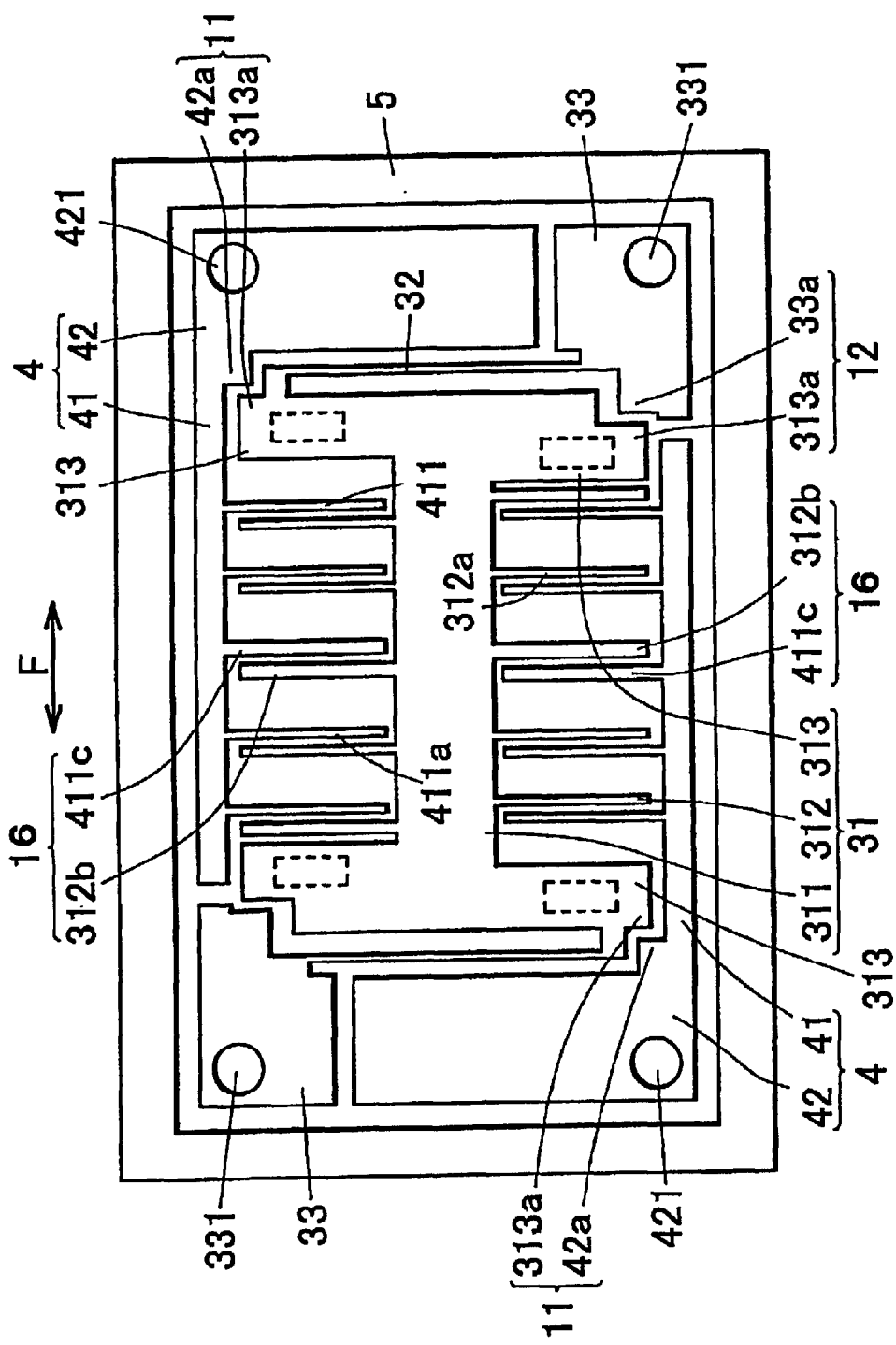
FIG. 6 is a schematic plan view showing the structure of the silicon structure that constitutes the inertia force sensor according to the fourth embodiment of the invention.

The inertia force sensor of this embodiment is a variation of the inertia force sensor of the first embodiment where at least a pair of cantilever electrodes is used in the fourth damper portion instead of the first and second damper portions. That is, as shown in FIG. 6, the fourth damper portion 16 of this embodiment includes the cantilever electrode 312b of the movable electrode portion 31 and the cantilever electrode 411c of the fixed electrode portion 42, while the cantilever electrode 312b and the cantilever electrode 411c are made thicker than the rest of the cantilever electrodes so as to increase the rigidity, and the distance between the cantilever electrode 312b and the cantilever electrode 411c is made smaller than the distance between the movable protruding portion and the fixed protruding portion of the first and second stopper portions. Accordingly, when an excessive inertia force is generated, first, the cantilever electrode 312b and the cantilever electrode 411c of the fourth damper portion 16 contact and flex so as to absorb the impact. Then the movable protruding portion and the fixed protruding portion of the first stopper portion 11 and the second stopper portion 12 butt with each other. Thus the impact of collision of the stopper portion is reduced and the stopper portion can be prevented from being damaged. Since the fourth damper portion 16 is disposed on both sides of the movable electrode portion 31 in the longitudinal direction, the fourth damper portion 16 is capable of making contact prior to the first and second stopper portions 11, 12 regardless of whether the inertia force is generated in either leftward or rightward direction.

Embodiment 5

Figure 9:
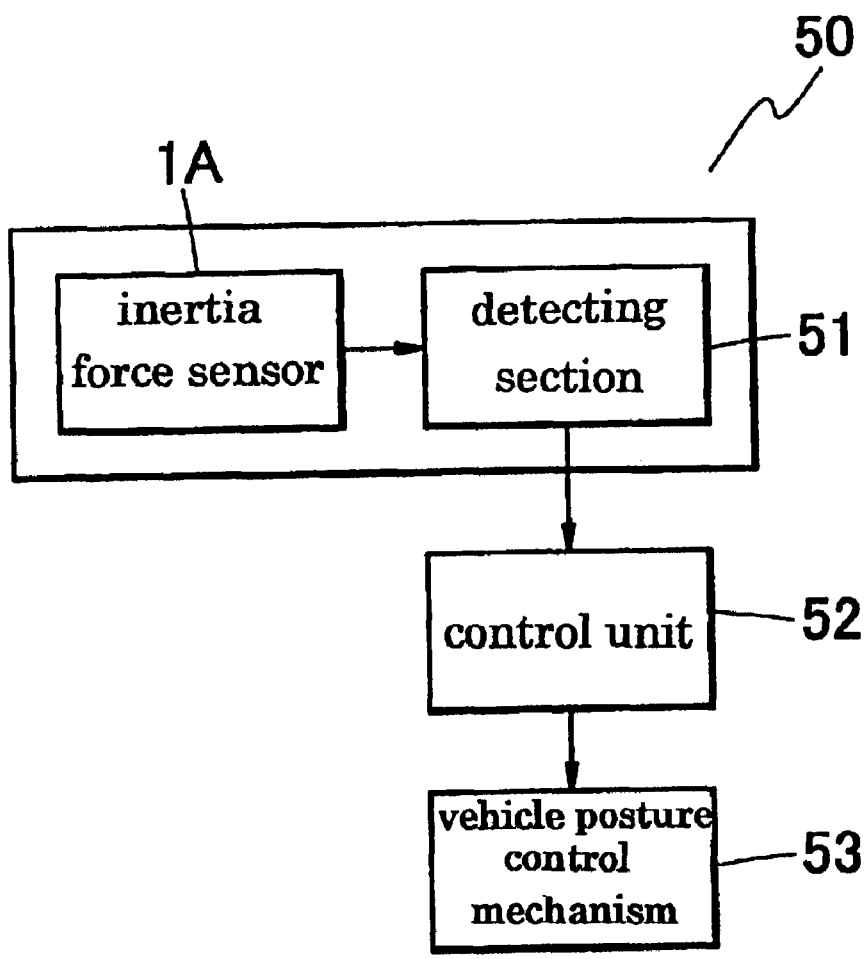
FIG. 9 is a schematic drawing showing the structure of the vehicle posture control system constituted by using the inertia force sensor of the invention.
Figure 10:
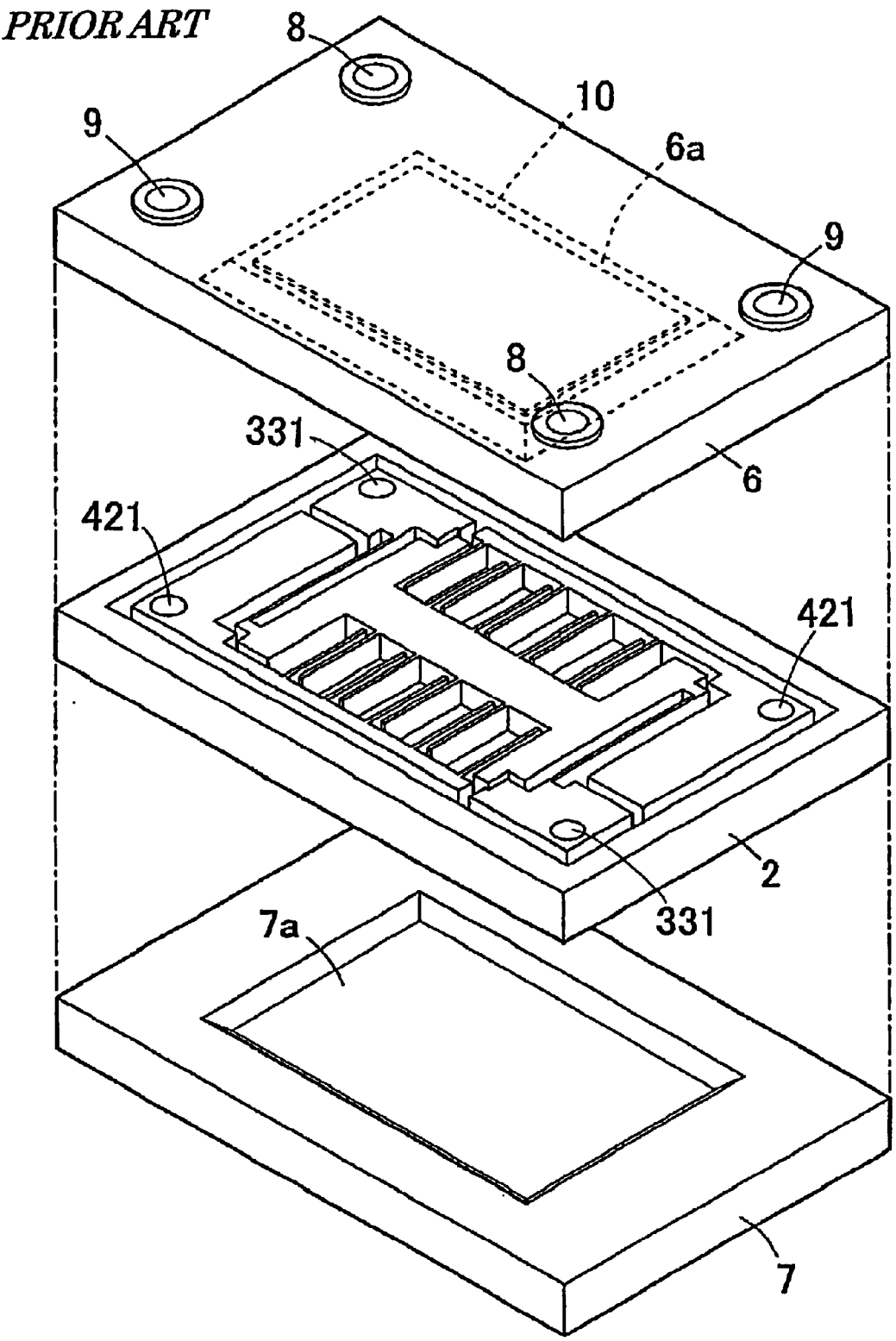
FIG. 10 is an exploded perspective view showing the structure of the inertia force sensor of the prior art.
Figure 11:
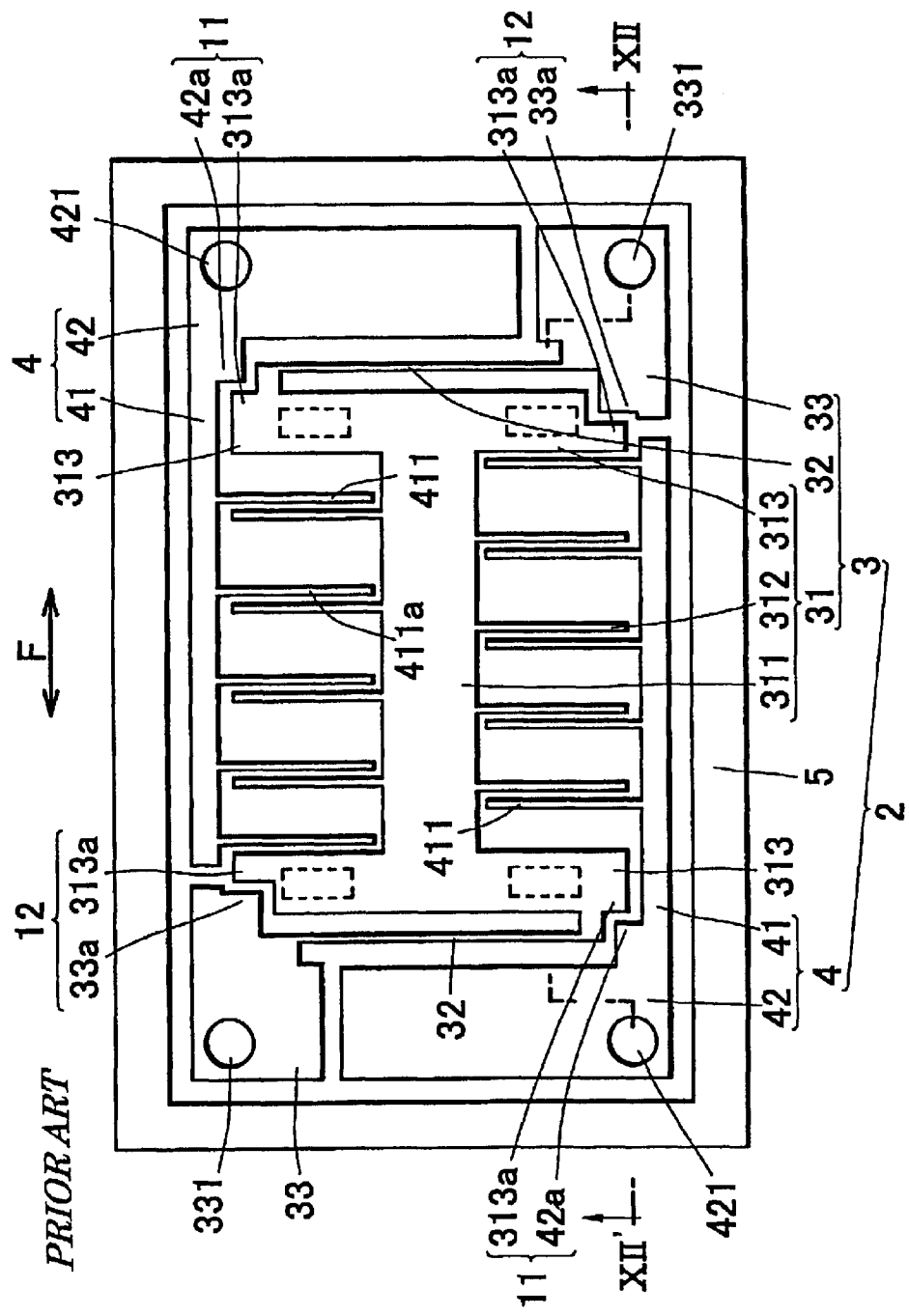
FIG. 11 is a schematic plan view showing the structure of the silicon structure that constitutes the inertia force sensor of the prior art.
Figure 12:
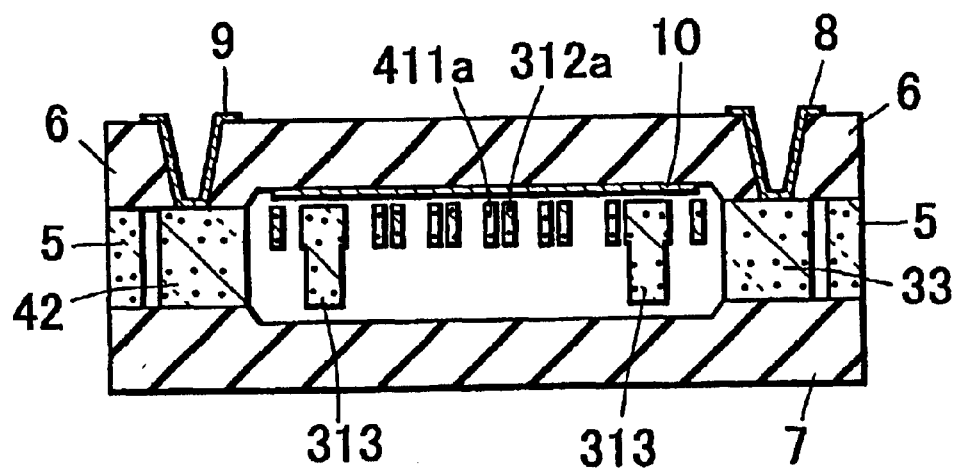
FIG. 12 is a schematic sectional view taken along lines XII-XII' in FIG. 11 showing the structure of the silicon structure that constitutes the inertia force sensor of the prior art.
Figure 13:
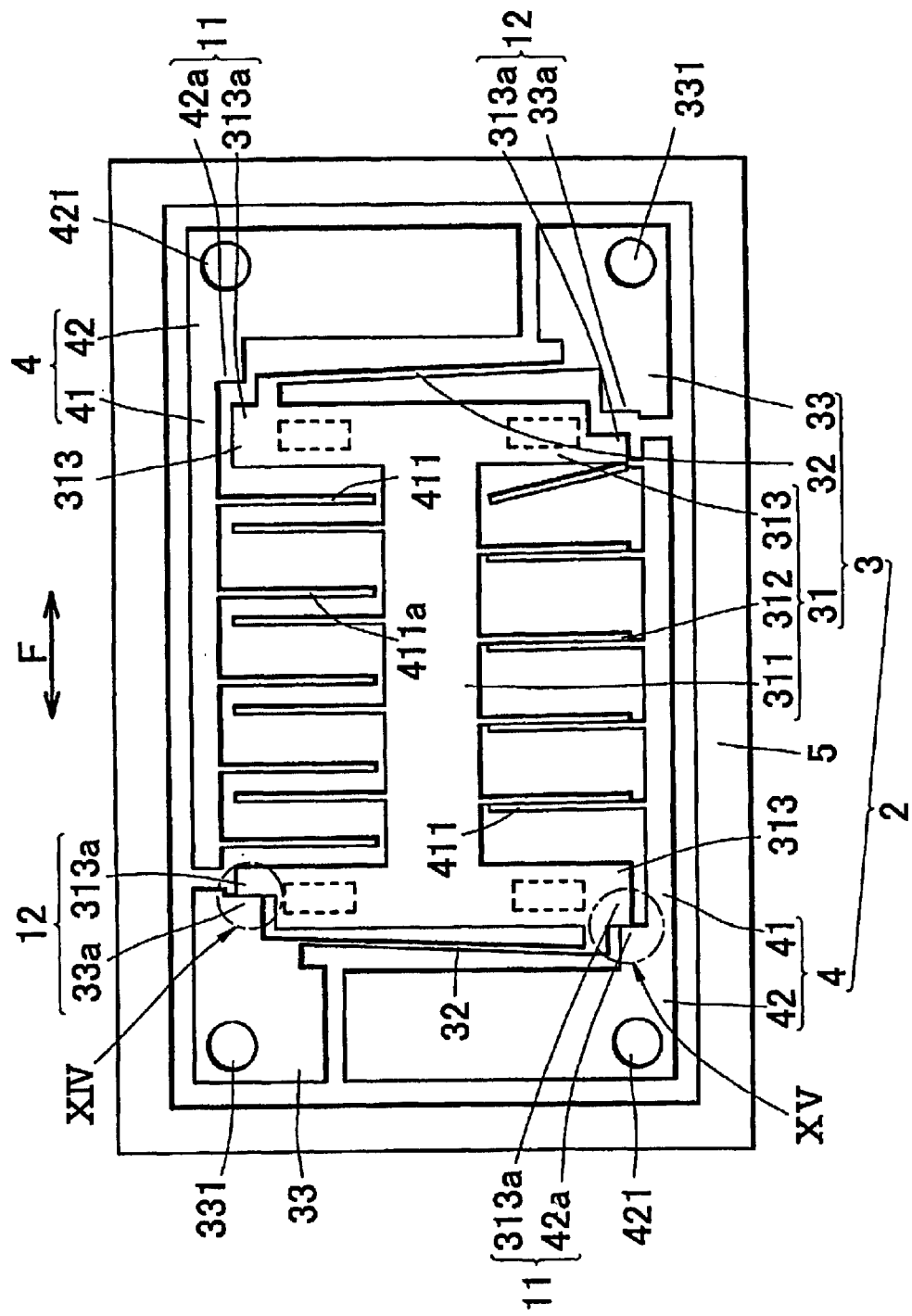
FIG. 13 is a schematic plan view showing the structure of the silicon structure that constitutes the inertia force sensor of the prior art, in a state where an excessive displacement has occurred in the direction of an inertia force.
Figure 14:
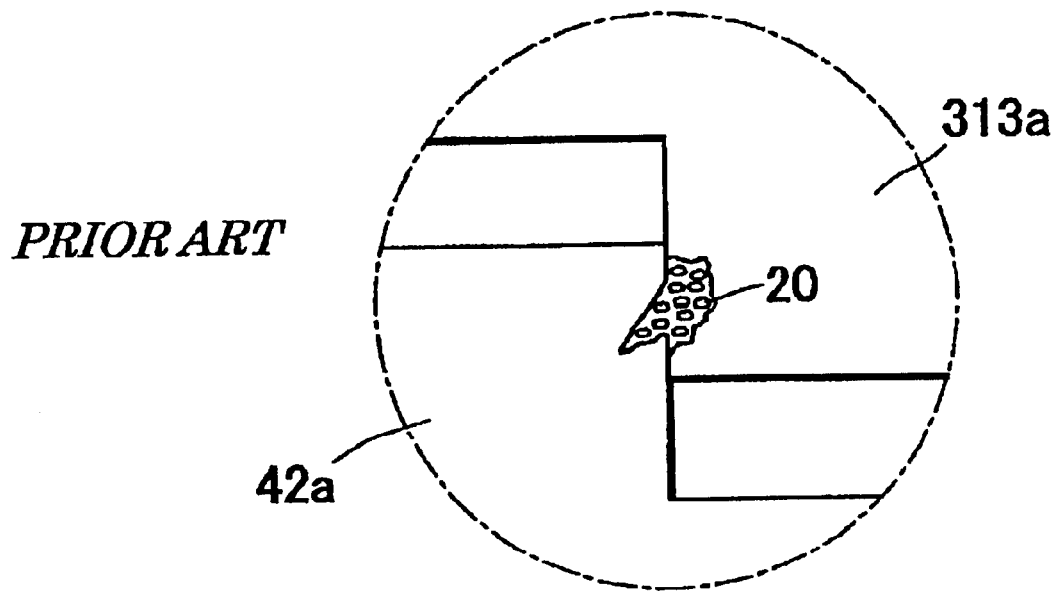
FIG. 14 is a partially enlarged schematic view of the stopper portion shown in FIG. 13.
Figure 15:
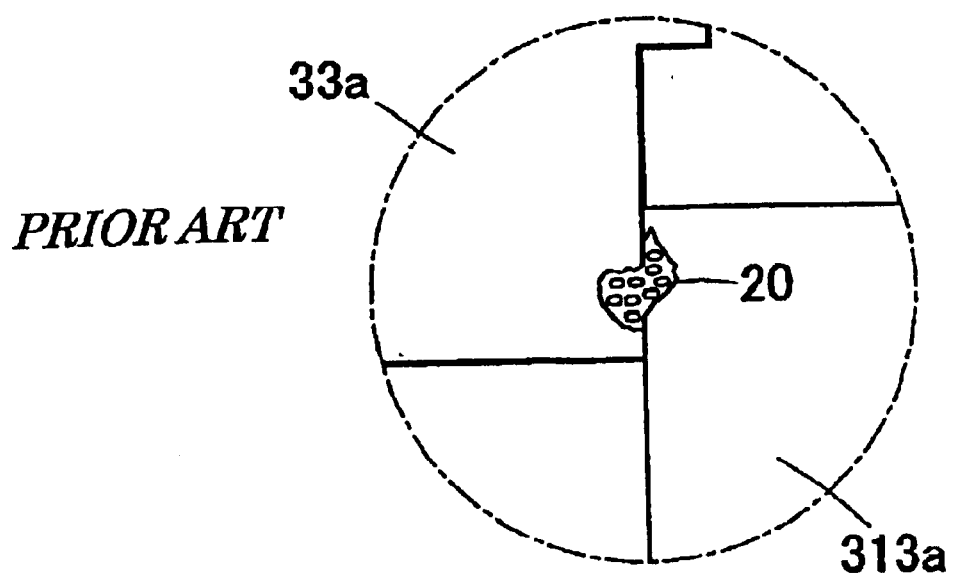
FIG. 15 is a partially enlarged schematic view of the stopper portion shown in FIG. 13.

This embodiment relates to a vehicle posture control system for automobile to which the inertia force sensor is applied. The inertia force sensor of any of the first to fifth embodiments can be used. FIG. 9 is a block diagram showing an example of the vehicle posture control system for automobile 50. Reference numeral 1A denotes an inertia force sensor, 51 denotes an inertia force detecting section, 52 denotes a control unit, and 53 denotes a vehicle posture control mechanism. When an inertia force is applied to the inertia force sensor 1A, distance between electrodes changes in the capacitive electrode constituted from the cantilever electrodes. The change in capacitance is converted by the inertia force detecting section 51 that incorporates a C-V converter into a voltage signal that is output. Then the control unit 52 controls the vehicle posture control mechanism 53 in accordance to the magnitude of the electrical signal that has been given, thereby maintaining the vehicle body always stable.

The inertia force sensor of the invention is, as described above, provided with the damper portion comprising the cantilever for the movable part disposed in the movable electrode portion so as to protrude therefrom and the cantilever for the fixed part disposed in the support portion for the movable part or the support portion for the fixed part so as to protrude therefrom, so that the cantilever for the movable part and the cantilever for the fixed part contact each other before the movable electrode portion contacts the support portion for the movable part and the support portion for the fixed part, thereby making it possible to prevent the stopper portion from being damaged and improve the reliability of the sensor.

Also because the damper portion is disposed near the stopper portion, impact on the stopper portion can be mitigated further.

Since the cantilever for the movable part and the cantilever for the fixed part are disposed substantially at right angles to the direction of displacement of the movable electrode, both cantilevers are made easier to make contact with each other so as to flex, thereby improving the capability to absorb the impact.

Since the distance between the cantilever for the movable part and the cantilever for the fixed part is made smaller than a distance between the movable electrode portion and the support portion of the movable portion, and also than a distance between the movable electrode portion and the support portion of the fixed portion in the stopper portion, the damper portion is made easier to make contact prior to the stopper portion.

Also because at least a pair of opposing cantilever electrodes of the comb-shaped electrode portion for the movable part and the comb-shaped electrode portion for the fixed part are made to have higher rigidity than the rest of the cantilever electrodes and are used as the damper portion, reliability of the sensor can be improved without increasing the number of manufacturing processes.

Although the present invention has been fully described by way of examples with references to the accompanying drawings, it is to be noted here that various changes and modifications will be apparent to those skilled in the art.

Therefore, unless such changes and modifications otherwise depart from the spirit and scope of the present invention they should be constructed as being included therein.

The invention relates to an inertia force sensor including a silicon structure formed on an insulating substrate and, more particularly, to an accelerometer or an angular velocity sensor used for vehicle posture control of an automobile or collision detection in an air bag system.

What is claimed is:

1. An inertia sensor comprising:
   insulating substrates; and
   a silicon structure that is bonded between the insulating substrate with a clearance space therebetween, said silicon structure having
   a movable portion and a fixed portion, the movable portion having a movable electrode displaceable in a direction of an inertial force applied to the sensor,
   first and second beam structures for the movable portion, connected to respective ends of the movable electrode and supporting the movable dec ode opposite the clearance space, and
   a pair of support portions for the movable portion that support the beam structures for the movable portion and are bonded to the insulating substrates, wherein the fixed portion has a fixed electrode opposing the movable electrode and a support portion for the fixed portion that supports the fixed electrode and is bond to the insulating substrates,
   stoppers that restrict displacement of the movable electrode on four outer corners of the first and second beam structures for the movable portion so the movable electrode is brought into contact with the support portions for the movable portion and the support portion for the fixed portion, and
   a damper, including a cantilever for the movable portion, provided on the movable electrode, protruding, therefrom, and extending opposite the clearance space, and a cantilever for the fixed portion provided on the support portions for the movable portion or the support portion for the fixed portion, protruding therefrom, and extending opposite the clearance space, disposed near each of the stoppers so that the cantilever for the movable portion and the cantilever for the fixed portion make contact with each other before the movable electrode contacts the support portions for the movable portion and the support portion for the fixed portion.

2. The inertia sensor according to claim 1, wherein the damper is disposed near the stoppers.

3. The inertia sensor according to claim 1, wherein the cantilever for the movable portion and the cantilever for the fixed portion are disposed substantially at right angles to the direction of movable electrode displacement.

4. The inertia sensor according to claim 1, wherein a distance between the cantilever for the movable portion and the cantilever for the fixed portion is smaller than a distance between the movable electrode and the support portions of the movable portion, and smaller than a distance between the movable electrode and the support portions of the fixed portion in the stoppers.

5. The inertia sensor according to claim 1, wherein
   the movable electrode has a comb-shaped electrode for the movable portion that includes a plurality of cantilever electrodes disposed on opposite sides of the movable portion in a longitudinal direction and extending opposite the clearance space, and the fixed electrode has a comb-shaped electrode for the fixed portion including a plurality of cantilever electrodes that extend opposite the clearance space, the plurality of cantilever electrodes of the comb-shaped electrode for the movable portion and the comb-shaped electrode for the fixed portion are opposite e ch other across a gap, and at least a pair of opposing cantilever electrodes of the comb-shape electrode for the movable portion and the comb-shaped electrode for the fixed portion are ore rigid than others of the cantilever electrodes, thereby forming a damper portion.

* * * * *